UNITED STATES PATENT OFFICE.

HARALD IMMANUEL HANNOVER, OF COPENHAGEN, DENMARK.

METHOD FOR PRODUCING SO-CALLED POROUS METALS.

1,042,111.          Specification of Letters Patent.      Patented Oct. 22, 1912.

No Drawing.      Application filed December 2, 1911. Serial No. 663,592.

*To all whom it may concern:*

Be it known that I, HARALD IMMANUEL HANNOVER, a subject of the King of Denmark, residing at Copenhagen, Denmark, have invented certain new and useful Improvements in a Method for Producing So-Called Porous Metals, of which the following is a full, clear, and exact description.

This invention has for its object to provide a process for the production of metals and alloys in a condition in which they have a very great number of fine pores. Such metals and alloys are hereinafter included in the term "porous metals".

The process is carried out as follows:—For the producing of these porous metals alloys are used in which the less fusible particles become solid during the solidification of the alloy before the other more easily fusible particles, especially eutectic alloys, solidify. When an alloy of this kind is heated to somewhat above the melting-point of the more easily fusible parts, especially the melting-point of a eutectic alloy, these parts and especially a eutectic alloy, can be driven out of the rest of the mass by being either blown out, sucked out, forced out by liquid pressure, or driven out by means of centrifugal force, shock, or vibration. In order for instance to blow out a eutectic alloy from an alloy, the same can be cast so as to form a tube or part of a tube or be placed as the bottom in a tube, and when the tube has been heated, the blowing out of the eutectic alloy can be effected by admitting a suitable gas or liquid such as carbonic acid under pressure into the tube. For instance the eutectic alloy may be blown out of a heated alloy of lead and antimony, richer in lead than the eutectic alloy of antimony and lead, by means of carbonic acid having an absolute pressure of about 2 atmospheres. The use of carbonic acid is preferred because this substance is neutral to the heated metals and alloys. However, it has been found most practical to drive out the more easily fusible parts by centrifugal force and especially the eutectic alloy of plates composed for instance of cast antimony and lead and containing more lead than the eutectic alloy. After the driving-out operation a porous metal is obtained consisting substantially of lead, which may be used for electric storage battery plates, filtering-plates, etc., since it presents an exceedingly large contact surface for the acid in the battery, whereby a storage battery of hitherto unknown large capacity and small weight may be produced. The pores of the porous metals may be filled with other substances in various ways. Oil may for instance be absorbed by these porous metals, or molten resin may be forced into the same. Bearings supplied with oil through the pores of the bearing-metal can thus be produced. When the porous metals are to be used for electric storage battery plates, the pores may be filled with powdered filling substance which is introduced suspended in a liquid or carried in by an air-current blowing on the plate, or sucked through the plate. The filling substance may also be chemically precipitated in the pores.

By this process for the production of porous metals by the removal of easily fusible alloys, especially eutectic alloys from alloys which are heated above the melting-point of the easily fusible alloy, a completely new class of substances may be produced, the pores of which may remain empty or be filled with other substances.

In the carrying out of the preferred form of the improved process for the production of electric storage battery plates by subjecting the metal-plates to centrifugal action in a room in which the air is heated, or in a warm liquid, a practical difficulty had to be overcome. The metal plates were not placed radially because this proved not to be so practical, but were placed at right angles to a radius. Each plate was placed in a mold, the outside part of which was formed by wire-gauze through which the easily fusible parts could be driven out by the centrifugal force, the gauze being supported on the outside by a grating of metal bars. The centrifugal force, however, caused the occurrence of stresses in the plates, so that owing to the partly molten state of the plates fissures formed in the same. In order to remove this difficulty one or more of the sides of the mold must be pressed against the plate during the process. For instance one or more swing weights swung out by the centrifugal operation action may by means of suitable connection organs be caused to press the sides of the mold inward with a slight pressure. The rotation of the apparatus may also be stopped for some moments and by means of a tightening mechanism one or more of the sides of the mold may receive a slight inward motion toward the metal plate or this can be the case during the rotation. Such expedients have overcome the difficulty above referred to.

As is well known an electric storage battery plate has a tendency to bend during the charging and discharging of the battery. This tendency may be removed by reversing the plates so that the side of the plate, which was facing outward during the centrifugal operation and became impressed by the wire-gauze, is now turned inward and continuing the centrifugal operation for some time longer. It has also proved possible to rend off the outermost surface of the plate or to shave it off in the still warm condition.

With a view of increasing their strength, the electric storage battery plates might be produced in such a manner that they partly consist of solid material in the shape of a frame, a skeleton, etc., partly of pore-metal. This may be effected in various ways. For instance a battery plate consisting of an alloy of lead and antimony which has been converted into a porous metal may be soldered to a frame of solid lead. Besides using this obvious method more special methods can be used, of which the following may serve as examples.

Part of the gauze through which the easily fusible parts flow out may be covered with "plate-strips" which prevent the flowing out at the parts in question. For instance the gauze may be covered along its edges so as to provide the porous metal with a solid frame, or a few strips extending from the places, where the currents are led in, may be covered in order to prevent a too strong current from locally attacking a battery plate. Further, provision may be made to prevent the easily fusible particles from being removed from the interior of the plate, so that a solid core is left in the plate. This is most easily done by means of vibrations, whereby the easily fusible parts are caused to flow out of the superficial portions of the plate, the inner portions of the plate being left unaffected.

A frame or a skeleton of pure lead may be placed in the mold in which the alloy of lead and antimony is cast and on to this skeleton the antimony alloy is cast, which will not become porous when the lead-antimony metal is converted into porous metal.

The improved process allows of casting electric storage battery plates in rather thick blocks, which are thereafter by sawing divided in plates.

The methods hereinbefore described are only to be considered as given by way of examples, and various details may be altered without departing from the nature of the invention; thus a number of plates may be produced at a time; the temperature may conveniently be kept at the desired height through electrical heating, etc.

When a porous metal produced by an alloy of lead and antimony has been obtained according to this invention porous metals or alloys with a higher melting-point can be produced by precipitating the same galvanically in the pores of the porous metal and treating the formed body as if it were an alloy viz. by heating the same until the original porous metal is melted, and then driving it out by any suitable means such as centrifugal action.

Porous metal of silver produced in this manner may be enameled by applying differently colored enamel pastes by means of a hair-pencil, so that they are absorbed in the pores, and afterward burning them in.

Porous metals produced according to this invention may be used for filtering purposes.

Having now described and ascertained my said invention and in what manner same is to be performed I declare that what I claim and desire to secure by U. S. A. Letters Patent is:

1. The process of producing porous metal which consists in making an alloy of two or more metals, then heating the alloy until lighter fusible segregations, especially consisting of a eutectic alloy, become fluid, while the rest of the alloy remains solid, and finally mechanically forcing the fluid particles out of the body of solid metal.

2. The process of producing porous metal in a given shape which consists in making an alloy of two or more metals and forming the same into the shape desired, then heating the body until lighter fusible segregations, especially consisting of a eutectic alloy, become fluid, while the rest of the body remains solid, and finally mechanically forcing the fluid particles out of the body of solid metal, substantially as described.

3. The process of making metallic articles which are porous in certain parts only which consists in forming the articles of an alloy of two or more metals, then covering the surface of such parts of the article as are to remain non-porous with shielding strips, then applying heat to the article until lighter fusible segregations, especially consisting of a eutectic alloy, become fluid, while the rest of the article remains solid, and finally mechanically forcing the fluid particles out of the uncovered parts of the article as described.

4. The process of making metal articles which consists in forming the same of an alloy of two or more metals, then applying heat thereto until lighter fusible segregations, especially consisting of a eutectic alloy, become fluid, while the rest of the article remains solid, then mechanically removing the fluid particles from the surface of the article and to any desired depth, while leaving the fluid metal in the deeper portions undisturbed, whereby the articles will have a porous surface, as set forth.

5. The process of making metallic articles which are porous locally, consisting in making parts of the article of a pure metal while other parts are made of an alloy of two or more metals, applying heat until fusible segregations, especially consisting of a eutectic alloy, become fluid, while the pure metal and the rest of the alloy remains solid and then mechanically forcing the fluid particles out of the articles, as set forth.

6. The process of producing porous metallic bodies consisting in forming the same of an alloy of two or more metals, applying heat until lighter fusible segregations, especially consisting of a eutectic alloy, become fluid, while the rest remains solid, then subjecting the body to centrifugal action while its surface is pressed upon by walls which prevent the formation of fissures in the said body.

7. In the process of producing porous metallic bodies, first making a porous metal or alloy body, then galvanically precipitating a metal or alloy of higher fusing point into the pores of the porous body, then applying heat until the metal or alloy of lower fusing point is liquid and finally removing said liquid metal from the body as described.

In witness whereof, I have subscribed my signature, in the presence of two witnesses.

HARALD IMMANUEL HANNOVER.

Witnesses:
F. PETERSEN,
W. SLETTING.